United States Patent
Shen (10) Patent No.: US 7,990,404 B2
(45) Date of Patent: Aug. 2, 2011

(54) METHOD FOR AUTOMATICALLY DETECTING AND SWITCHING VIDEO SIGNALS ON A MONITOR

(75) Inventor: Shih-Sheng Shen, Sindian (TW)

(73) Assignee: Hannspree, Inc., Taipei (TW)

( * ) Notice: Subject to any disclaimer, the term of this patent is extended or adjusted under 35 U.S.C. 154(b) by 772 days.

(21) Appl. No.: 12/044,307

(22) Filed: Mar. 7, 2008

(65) Prior Publication Data
US 2009/0225108 A1 Sep. 10, 2009

(51) Int. Cl.
G09G 5/02 (2006.01)
(52) U.S. Cl. .......................... 345/699; 345/3.4
(58) Field of Classification Search .................. 345/699, 345/3.4
See application file for complete search history.

(56) References Cited

U.S. PATENT DOCUMENTS

6,295,048 B1 * 9/2001 Ward et al. .................... 715/785
7,460,178 B2 * 12/2008 Kondo et al. ................. 348/576
* cited by examiner Primary Examiner — Kevin Nguyen
Assistant Examiner — Kenneth B Lee, Jr.
(74) Attorney, Agent, or Firm — Caesar, Rivise, Bernstein, Cohen & Pokotilow, Ltd.

(57) ABSTRACT

A method for automatically detecting and switching video signals on a monitor has steps of storing multiple menu groups in the monitor and executing a resolution identifying mode. Each menu group has multiple similarly public resolutions. The resolution identifying mode has acts of determining whether the video resolution of the video signal matches one of the resolutions in one of the menu groups and creating a launch menu to show all the resolutions in the menu group having the resolution matched to the video resolution of the video signal when the video resolution of the video signal matches one of the resolutions in one of the menu groups. Therefore, the method solves the problem of misapplying resolutions on the conventional monitor.

12 Claims, 7 Drawing Sheets

FIG. 1A

NEAR TIMING MODE

Source Select

Adjust   D-sub   DVI-D   HDMI

METHOD FOR AUTOMATICALLY DETECTING AND SWITCHING VIDEO SIGNALS ON A MONITOR

BACKGROUND OF THE INVENTION

1. Field of the Invention

The present invention relates to a method, and more particularly to a method for automatically detecting and switching video signals on a monitor.

2. Description of Related Art

Monitors are used to display videos having video resolutions from computers. The monitors include conventional cathode ray tube (CRT) monitors and liquid crystal display (LCD) monitors. Volumes, weights and sizes of the LCDs are relatively smaller and lighter than the CRT monitors are. Furthermore, the present monitors have better aspect ratio and provide more resolution selections and a resolution auto-adjusting function. The present monitor has a 16:10 aspect ratio that is better than the aspect ratio of the conventional monitor, which is 5:4. The resolution auto-adjusting function finds one of the resolutions in the resolution selections, such as 1024×768, 1280×768, 1360×768 and etc, wherein the found resolution matches the video resolution of the video from the computer. However, the resolution auto-adjusting function often misapplies resolutions. For example, the 1280×768 resolution is often misapplied to be the 1024×768 resolution. Therefore, the video will not fittingly show on the monitor.

In addition, the present monitors have not only VGA (or D-subminiature) input connectors but further have digital input connectors, such as digital visual interface in digital mode (DVI-D), high-definition multimedia interface (HDMI), and analog input connectors, such as composite video blanking and sync (CVBS), Y/C, YpbPr and etc., to allow the monitors to be compatible with videos played by other media players. Each monitor further has an on screen display (OSD) menu function. The OSD menu allows a user to apply and change multiple settings of the present monitor, and one of the settings is to select showing digital videos or analog videos on the present monitor. When apply the setting of choosing showing digital videos or analog videos, the user has to operate the OSD menu to call up the OSD menu first. After calling the OSD menu, the user selects one of the multiple sub-menus in the OSD menu that presents options for choosing digital videos and analog videos so the user can make choice to either watch digital videos or analog videos. However, choosing to show digital videos or analog videos on the present monitors is inconvenient because the user has many procedures to perform before selecting digital videos or analog videos.

To overcome the shortcomings, the present invention provides a method for automatically detecting and switching video signals on a monitor to mitigate or obviate the aforementioned problems.

SUMMARY OF THE INVENTION

The main objective of the invention is to provide a method for automatically detecting and switching video signals on a monitor.

The method in accordance with the present invention comprises steps of storing multiple menu groups in the monitor and executing a resolution identifying mode. Each menu group has multiple similarly public resolutions. The resolution identifying mode has acts of determining whether the video resolution of the video signal matches one of the resolutions in one of the menu groups and creating a launch menu to show all the resolutions in the menu group having the resolution matched to the video resolution of the video signal when the video resolution of the video signal matches one of the resolutions in one of the menu groups. Therefore, the method solves the problem of misapplying resolutions on the conventional monitor.

Other objectives, advantages and novel features of the invention will become more apparent from the following detailed description when taken in conjunction with the accompanying drawings.

DETAILED DESCRIPTION OF PREFERRED EMBODIMENT

A method for automatically detecting and switching video signals in accordance with the present invention is applied to a monitor. The monitor has multiple setting buttons and a video graphics adapter (VGA) input connector and may further comprise a digital visual interface in digital mode (DVI-D) input connector, a high-definition multimedia interface (HDMI) input connector, a composite video blanking and sync (CVBS) input connector, a Y/C input connector and a YpbPr input connector to receive a video signal having a video resolution.

The monitor further stores a resolution auto-adjusting function and multiple menu groups. Each menu group comprises multiple similarly public resolutions. For example, the menu groups may be but not limit to:

menu group A comprises 640×480 and 848×480 resolutions;

menu group B comprises 1024×768, 1280×768 and 1360×768 resolutions;

menu group C comprises 1400×1050 and 1680×1050 resolutions;

menu group D comprises 640×400, 720×400 and 640×480 resolutions, wherein the 640×480 resolution is applied when a frequency of the video signal is 70 hertz; and menu group E comprises 640×350 and 720×350 resolutions.

The method of the present invention comprises a resolution identifying mode and a source switching mode.

Figure 1A:
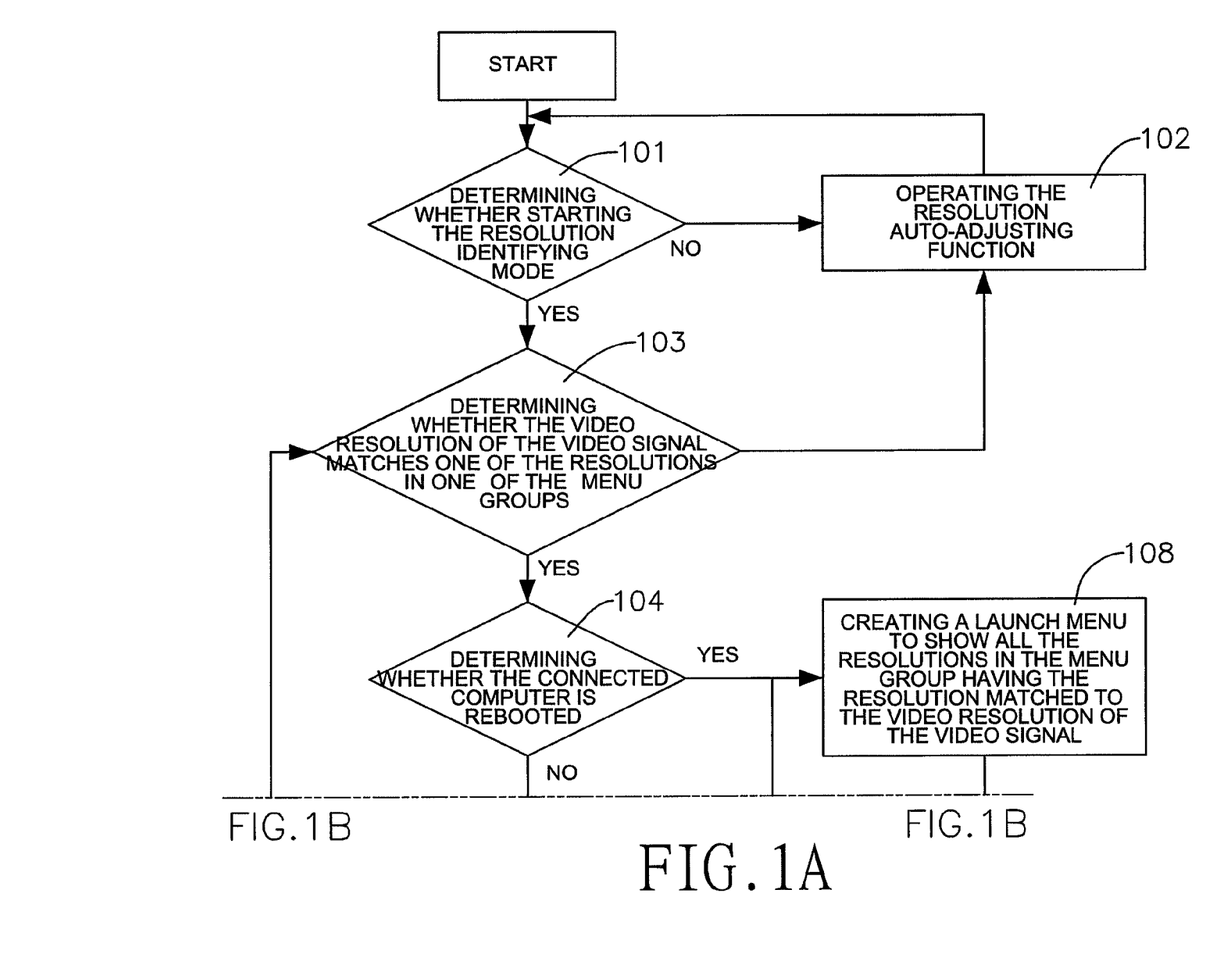
FIGS. 1A and 1B show a flowchart of a resolution identifying mode in a method in accordance with the present invention.
Figure 1B:
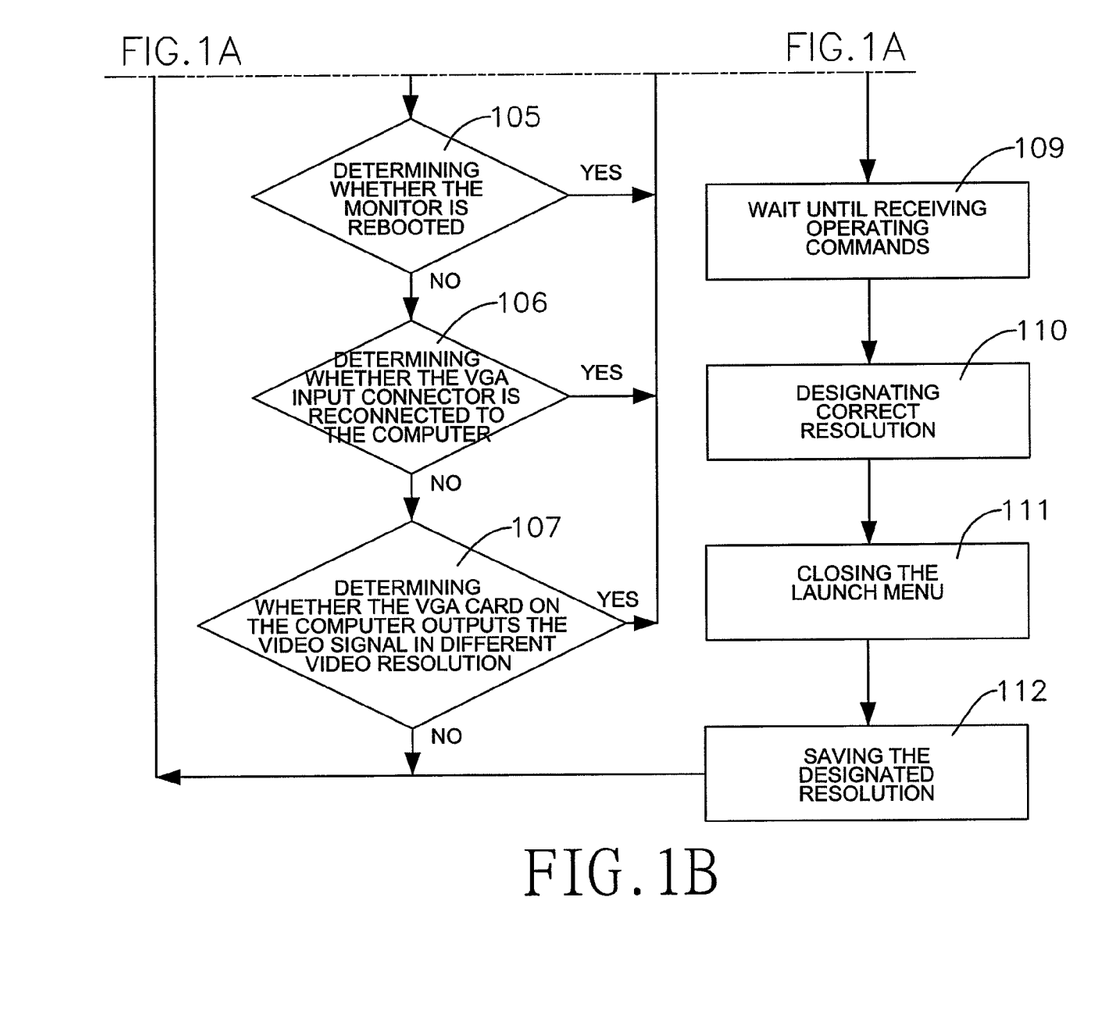

With reference to FIGS. 1A and 1B, when the monitor is connected to a VGA card in a computer through the VGA input connector, the resolution identifying mode comprises steps of determining whether starting the resolution identifying mode (101) by detecting whether the VGA input connector receives the video signal, determining whether the video resolution of the video signal matches one of the resolutions in one of the menu groups when the resolution identifying mode starts (103), operating the resolution auto-adjusting function when either the resolution identifying mode does not start or the video resolution of the video signal does not match any resolution belonging to one of the menu groups (102), determining whether the connected computer is rebooted when the video resolution of the video signal matches one of the resolutions in one of the menu groups (104), determining whether the monitor is rebooted when the connected computer is not rebooted (105), determining whether the VGA input connector is reconnected to the computer when the monitor is not rebooted (106), determining whether the VGA card on the computer outputs the video signal in different video resolution when the VGA input connector is not reconnected to the computer (107), creating a launch menu to show all the resolutions in the menu group having the resolution matched to the video resolution of the video signal when either the connected computer is rebooted, the monitor is rebooted, the VGA input connector is reconnected to the computer or the VGA card on the computer outputs the video signal in different video resolution (108), wait until receiving operating commands (109), designating correct resolution (110), closing the launch menu (111) and saving the designated resolution (112). Moreover, go back to the step of determining whether the video resolution of the video signal matches one of the resolutions in one of the menu groups (103) after the step of saving the designated resolution (112).

Figure 2:
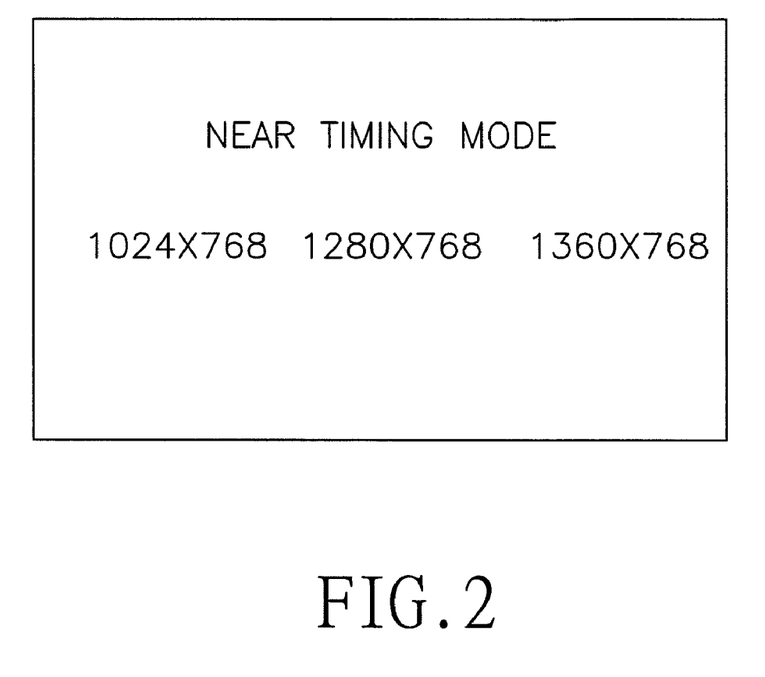
FIG. 2 is a scene of a launch menu created by the resolution identifying mode.

The step of creating a launch menu to show all the resolutions in the menu group having the resolution matched to the video resolution of the video signal (108) creating a launch menu in an on screen display (OSD) menu form to show all the resolutions in the menu group having the resolution matched to the video resolution of the video signal. For example, if the video signal has a 1280×768 video resolution, the matched resolution will be in menu group B. With reference to FIG. 2, the launch menu will therefore show 1024× 768, 1280×768 and 1360×768 resolutions on the monitor. Furthermore, the user then can select one of the 1024×768, 1280×768 and 1360×768 resolutions shown on the monitor by using the setting button on the monitor based on the correct video resolution, which is 1280×768, to finish the step of designating correct resolution (110).

Figure 3A:
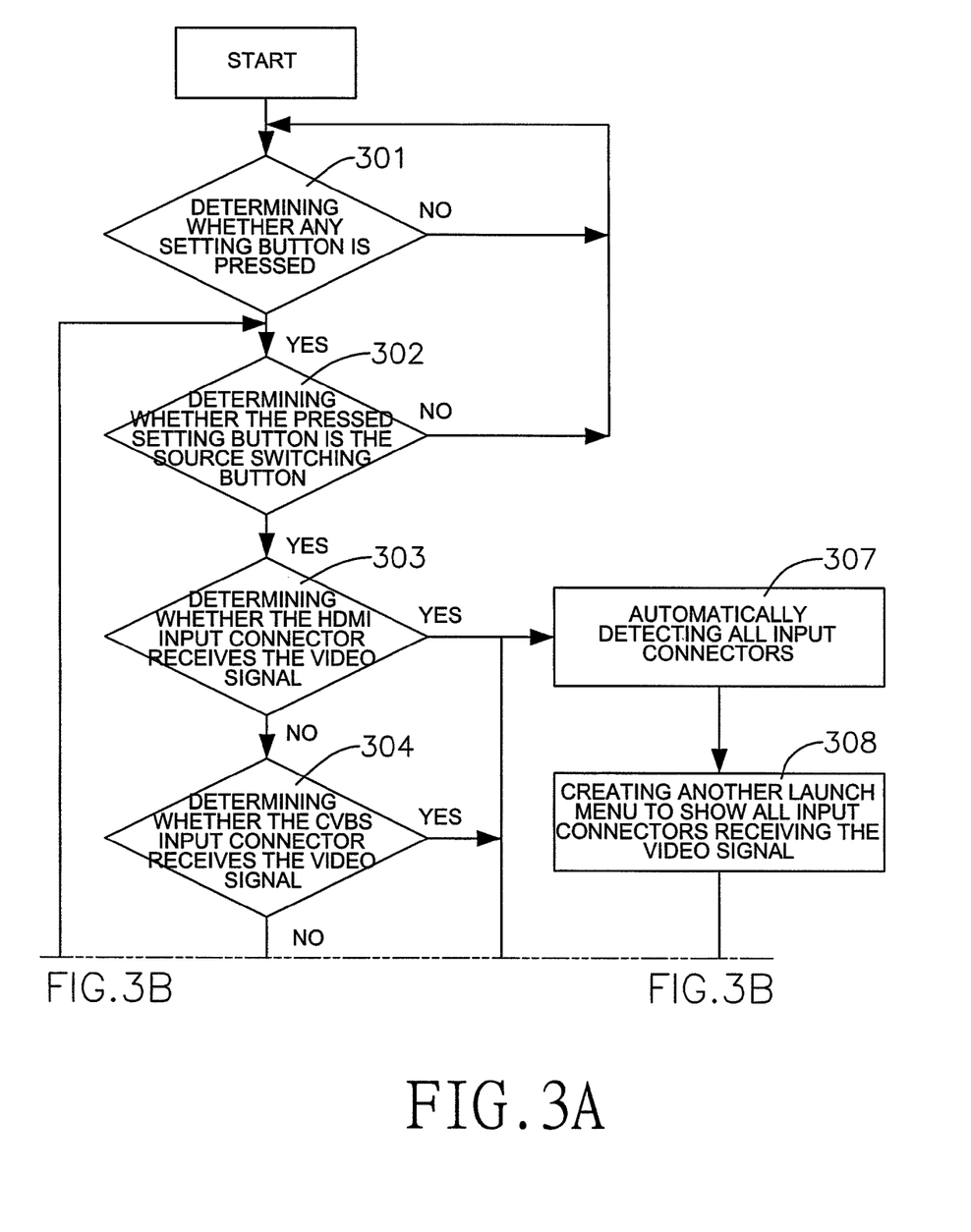
FIGS. 3A and 3B show a flowchart of a source switching mode in a method in accordance with the present invention.
Figure 3B:
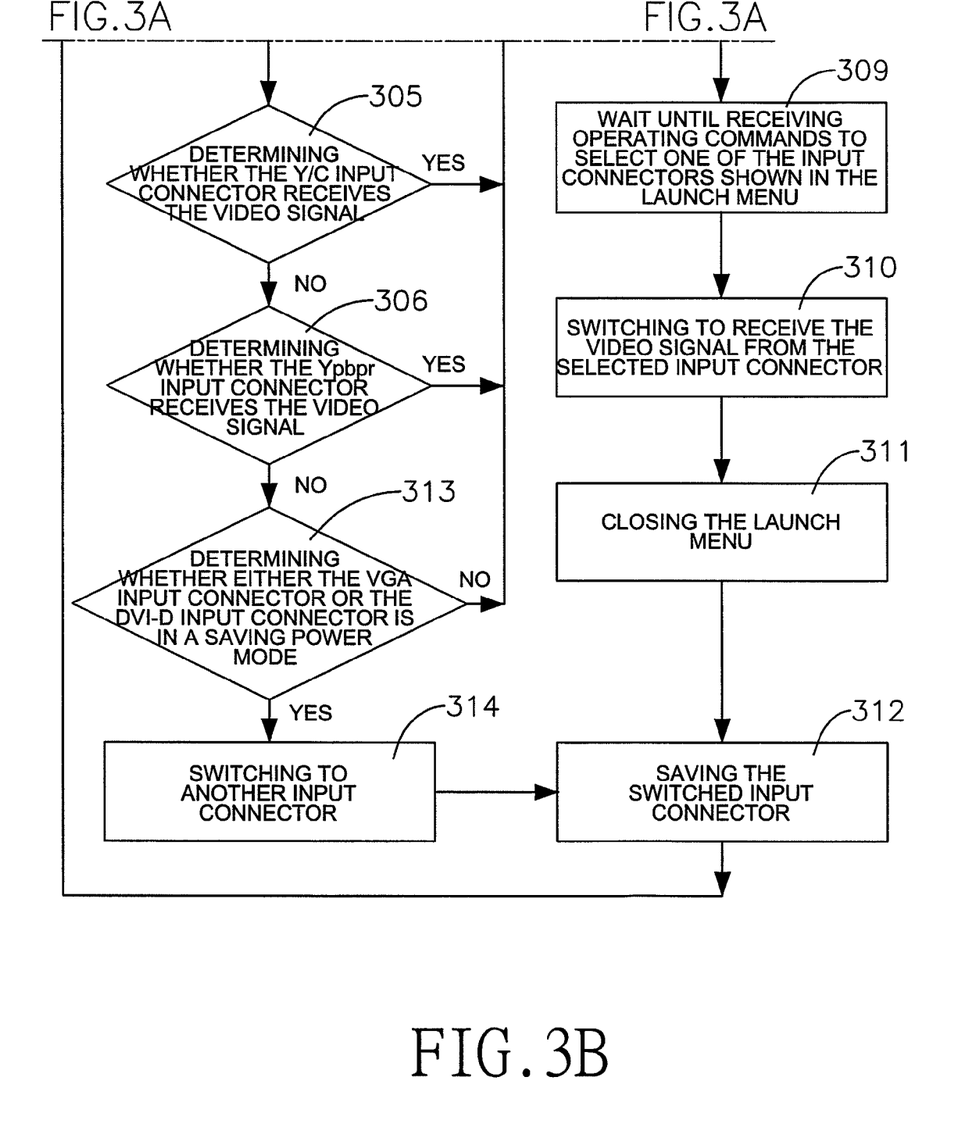
Figure 4:
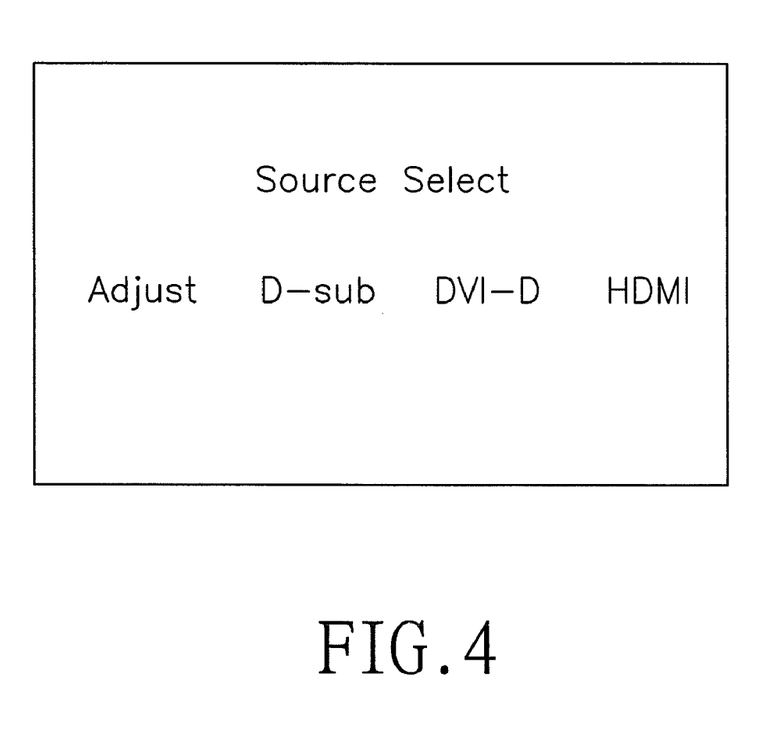
FIG. 4 is a scene of a launch menu created by the source switching mode.

In addition, with further reference to FIGS. 3A and 3B, when one of the setting buttons is defined to be a source switching button, the source switching mode comprises steps of determining whether any setting button is pressed (301), determining whether the pressed setting button is the source switching button when one of the setting buttons is pressed (302), determining whether the HDMI input connector receives the video signal when the pressed setting button is the source switching button (303), determining whether the CVBS input connector receives the video signal when the HDMI input connector does not receive the video signal (304), determining whether the Y/C input connector receives the video signal when the CVBS input connector does not receive the video signal (305), determining whether the YpbPr input connector receives the video signal when the Y/C input connector does not receive the video signal (306), determining whether either the VGA input connector or the DVI-D input connector is in a saving power mode when the YpbPr input connector does not receive the video signal (313), automatically detecting all input connectors when either the HDMI input connector, the CVBS input connector, the Y/C input connector or the YpbPr input connector receives the video signal or when either the VGA input connector or the DVI-D input connector is not in a saving power mode (307), creating another launch menu to show all input connectors receiving the video signal (308) as shown in FIG. 4, wait until receiving operating commands to select one of the input connectors shown in the launch menu (309), switching to receive the video signal from the selected input connector (310), closing the launch menu (311), switching to another input connector when either the VGA input connector or the DVI-D input connector is in a saving power mode (314) and saving the switched input connector after either closing the launch menu or switching to another input connector when either the VGA input connector or the DVI-D input connector is in a saving power mode (312). Moreover, go back to the step of determining whether the pressed setting button is the source switching button (302) after the step of saving the switched input connector (312). Therefore, the source switching mode allows the user to conveniently switch the monitor to connect to the input connector having video signal.

Furthermore, the monitor also has a source auto-detecting function. The source auto-detecting function detects all input connectors and switch automatically to connect to the input connector having video signal.

Figure 5:
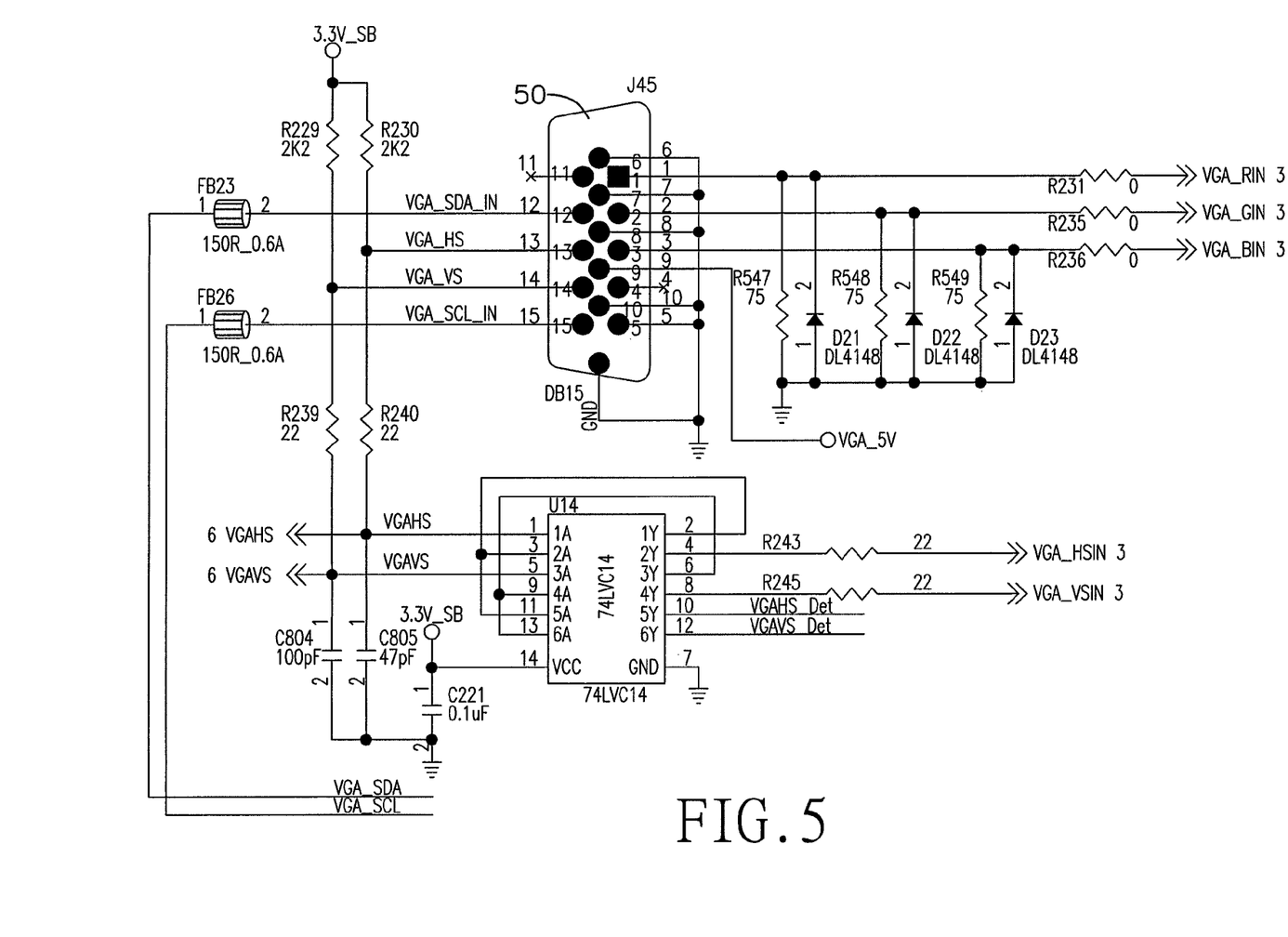
FIG. 5 is a circuit diagram for determining whether a video graphics adapter input connector receives a video signal.

With reference to FIG. 5, the VGA input connector (50) has multiple input terminals, and the thirteenth and the fourteenth input terminals (Hsync(RTD_H), Nsync(RTD_V)) are used to determine whether the VGA input connector receives the video signal, whether the video signal is an out of range video signal and whether the video resolution of the video signal matches one of the resolutions in one of the menu groups.

Figure 6:
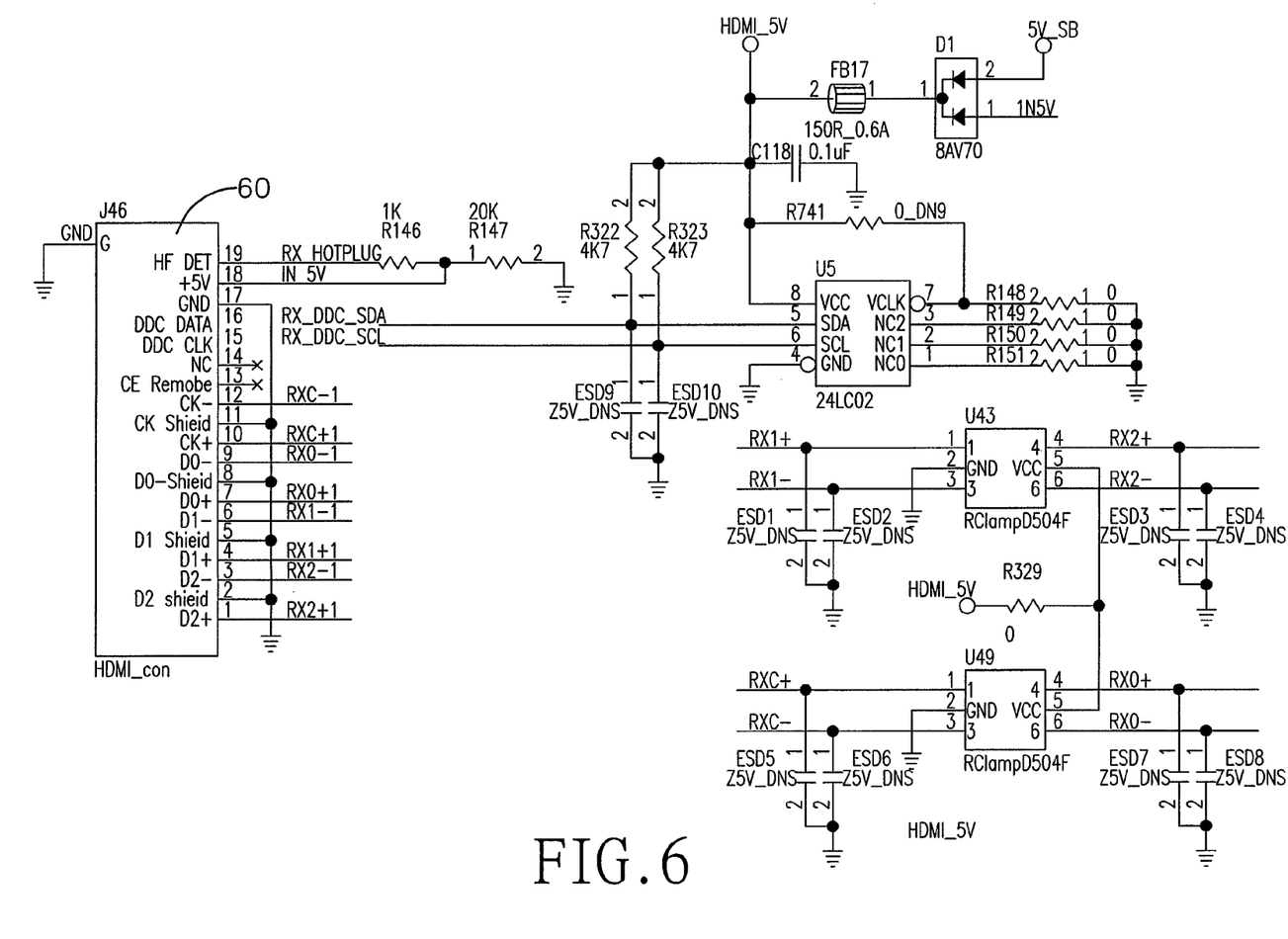
FIG. 6 is a circuit diagram for determining whether a high-definition multimedia interface or a digital visual interface in digital mode input connector receives a video signal.

With further reference to FIG. 6, the HDMI input connector (60) is also used to be the DVI-D input connector because the HDMI protocol is compatible with the DVI-D protocol. The HDMI input connector (60) has multiple input terminals. When the nineteenth input terminal (RX HOTPLUG) receives a high level signal, the HDMI input connector (60) receives the video signal. On the contrary, the HDMI input connector (60) does not receive the video signal. Furthermore, the resolution identifying mode determines whether the HDMI input connector (60) receives the video signal and whether the video signal is an out of range video signal based on inframe format in TMDS signals on the CLK+, CLK−, DATA0+, DATA0−, DATA1+, DATA1−, DATA2+ and DATA2− input terminals.

In addition, the CVBS protocol mixes the Hsync and Vsync signals in the video signal, and the Y/C and YpbPr protocols mix the Hsync and Vsync signals in a Y signal in the video signal. Therefore, the monitor further has an analog to digital converter (ADC) to convert the analog video signal from the CVBS, Y/C and YpbPr input connectors into digital video signal so the resolution identifying mode is able to determine whether the CVBS, Y/C and YpbPr input connectors receive the video signal and whether the video signal is an out of range video signal.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A method for automatically detecting and switching video signals on a monitor having:
   an input connector receiving an input video having a video resolution;
   multiple other input connectors; and
   multiple setting buttons;
   said method comprising steps of:

storing multiple menu groups in the monitor, and each menu group comprising multiple similarly public resolutions;

executing a resolution identifying mode after the monitor is turned on, wherein the step of executing the resolution identifying mode comprises acts of:
determining whether the video resolution of the video signal matches one of the resolutions in one of the menu groups; and
creating a launch menu to show all the resolutions in the menu group having the resolution matched to the video resolution of the video signal when the video resolution of the video signal matches one of the resolutions in one of the menu groups; and executing a source switching mode comprising acts of:
determining whether any setting button is pressed;
determining whether all input connectors receive the video signal when one of the setting buttons is pressed;
automatically detecting all input connectors when one of the input connectors receives the video signal;
creating a launch menu to show all input connectors receiving the video signal on the monitor;
determining whether the input connector is in a saving power mode when the input connector does not receive the video signal;
automatically detecting all input connectors and creating a launch menu to show all input connectors receiving the video signal on the monitor when the input connector is not in a saving power mode; and
automatically detecting all input connectors and switching to another input connector when the input connector is in a saving power mode.

2. The method as claimed in claim 1, wherein the step of executing the resolution identifying mode further comprises an act of:
determining whether the connected computer is rebooted when the video resolution of the video signal matches one of the resolutions in one of the menu groups, and creating a launch menu to show all the resolutions in the menu group having the resolution matched to the video resolution of the video signal when the connected computer is rebooted.

3. The method as claimed in claim 1, wherein the step of executing the resolution identifying mode further comprises an act of determining whether the monitor is rebooted when the video resolution of the video signal matches one of the resolutions in one of the menu groups, and creating a launch menu to show all the resolutions in the menu group having the resolution matched to the video resolution of the video signal when the monitor is rebooted.

4. The method as claimed in claim 1, wherein
the input connector is a video graphics adapter input connector; and
the step of executing the resolution identifying mode further comprises an act of determining whether the video graphics adapter input connector is reconnected to the computer when the video resolution of the video signal matches one of the resolutions in one of the menu groups, and creating a launch menu to show all the resolutions in the menu group having the resolution matched to the video resolution of the video signal when the video graphics adapter input connector is reconnected to the computer.

5. The method as claimed in claim 1, wherein the step of executing the resolution identifying mode further comprises an act of determining whether a video graphics adapter card on the computer outputs the video signal in different video resolution when the video resolution of the video signal matches one of the resolutions in one of the menu groups, and creating a launch menu to show all the resolutions in the menu group having the resolution matched to the video resolution of the video signal when the video graphics adapter card on the computer outputs the video signal in different video resolution.

6. The method as claimed in claim 1, wherein
the input connector is a video graphics adapter input connector; and
the resolution identifying mode starts when the video graphics adapter input connector receives the video signal.

7. The method as claimed in claim 2, wherein
the input connector is a video graphics adapter input connector; and
the resolution identifying mode starts when the video graphics adapter input connector receives the video signal.

8. The method as claimed in claim 3, wherein
the input connector is a video graphics adapter input connector; and
the resolution identifying mode starts when the video graphics adapter input connector receives the video signal.

9. The method as claimed in claim 4, wherein the resolution identifying mode starts when the video graphics adapter input connector receives the video signal.

10. The method as claimed in claim 5, wherein
the input connector is a video graphics adapter input connector; and
the resolution identifying mode starts when the video graphics adapter input connector receives the video signal.

11. The method as claimed in claim 1, wherein the launch menu is in an on screen display menu form.

12. The method as claimed in claim 1, wherein the launch menu is in an on screen display menu form.

* * * * *